Aug. 7, 1928.
K. L. HARRIS
AUTOMOBILE BUMPER
Filed Feb. 7, 1928
1,679,823
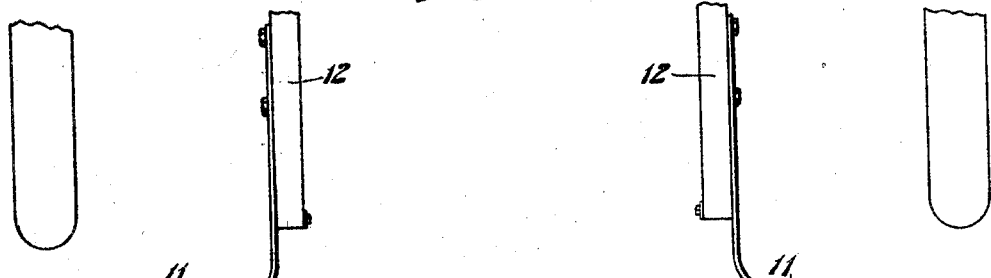
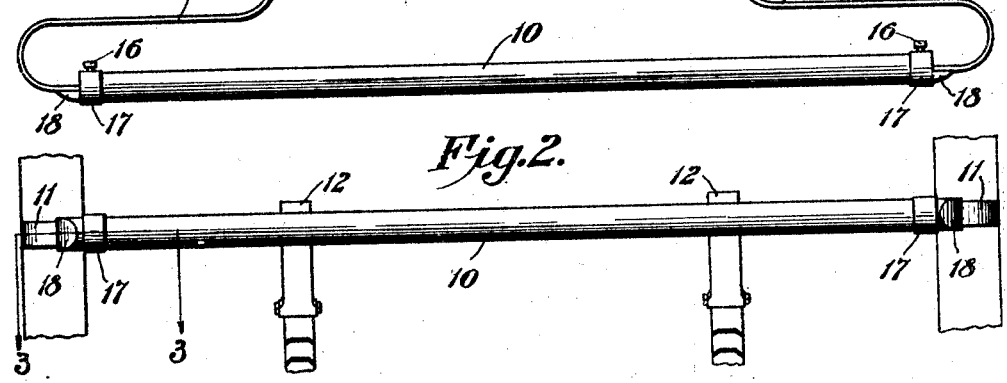
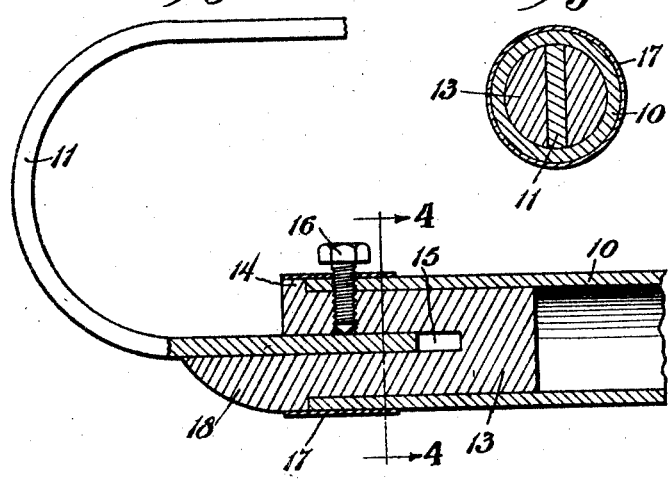
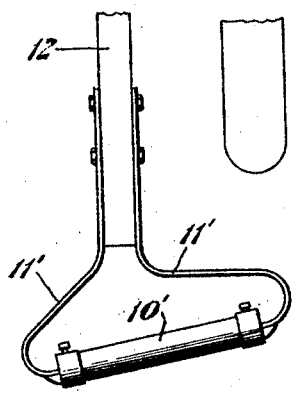
Kenneth L. Harris
INVENTOR
BY
Siggers & Adams
ATTORNEYS Patented Aug. 7, 1928.

1,679,823

UNITED STATES PATENT OFFICE.

KENNETH LESTER HARRIS, OF NEW BRIGHTON, PENNSYLVANIA.

AUTOMOBILE BUMPER.

Application filed February 7, 1928. Serial No. 252,579.

This invention relates to automobile bumpers and aims, among other objects, to provide an improved bumper having provision for adjustment so that it may be attached to the chassis of any ordinary automobile. More specifically, the invention aims to provide an improved joint or connection between flat bumper springs and bumper bars.

In the drawing:

Fig. 1 is a top plan view of a bumper embodying the invention.

Fig. 2 is a front elevation of the bumper shown in Fig. 1.

Fig. 3 is a sectional view taken on the line 3—3 of Fig. 2.

Fig. 4 is a sectional view taken on the line 4—4 of Fig. 3 and

Fig. 5 is a top plan view of a modified form of bumper adapted to be used as a fender guard at the rear of a vehicle.

Referring particularly to the drawing, there is shown in Figures 1 to 4 inclusive, a tubular buffer bar 10, to the opposite ends of which are connected spring arms 11 preferably made of flat steel bars curved to provide for the desired spring action and so arranged that they may be connected at their rear ends, to the chassis frame 12 of an automobile. Herein, the spring arms have opposed, inwardly extending, straight end portions adapted to be connected to the tubular buffer bar.

Referring to Figs. 3 and 4 of the drawing, there is shown a fitting in the form of a slotted member adapted to receive the front end of a spring arm 11. In the present example, each of the fittings comprises a plug 13 preferably made of cast iron so shaped that it may be inserted within the tubular bar and this plug has an end shoulder or flange 14 of the same external diameter or dimensions as that of the tubular bar. A longitudinal slot 15 is formed in the plug to receive the straight end of the spring arm and to secure the plug and spring arm within the buffer bar, there is shown a set screw 16 threaded through registering openings in the plug and the rear wall of the buffer bar. Thus, the effective width of the bumper can be adjusted by sliding the straight ends of the arms within the slots and securing them in adjusted positions.

To give the buffer bar a finished or pleasing appearance there is shown a pair of ferrules or sleeves 17 adapted to be slipped over the ends of the buffer bar and cover the flanges of the cast metal plugs 14. These ferrules may be made of highly polished metal which contrasts with any enamel or paint applied to the buffer bar and may also be secured in place by the set screws 16 as shown in Fig. 3.

To avoid any abrupt shoulder portions on the bumper such as would be produced by the end of the tubular bar or a flat end of the plug 13, there is shown a rounded fillet member 18 which is preferably cast integral with the plug on the front side of the slot 15 so that it merges into the surface of the flat spring arm. Thus, the front of the bumper presents a substantially continuous surface. Obviously the fillets may be separate pieces secured to the spring arms 11 and accomplish the same result.

Referring to Fig. 5, there is shown a short bumper having a buffer bar 10', adapted to protect a rear fender and the arms 11' are suitably bent to carry the bar at an angle to the rear axle of the automobile. These arms may be connected to the chassis frame 12 in the customary manner.

From the foregoing description it will be seen that the improved bumper may be made very cheaply since the joint fittings are the only special parts required. Moreover, broken parts may be replaced at small expense. Further, the bumper is sufficiently strong to withstand all ordinary impacts.

Obviously the present invention is not restricted to the particular embodiment thereof herein shown and described.

What is claimed is:

1. A vehicle bumper comprising, in combination, a buffer bar having slotted members associated with its opposite ends; flat spring arms adapted to be secured to the vehicle chassis and having end portions inserted in said slotted members; and means to secure said members and spring arms to said buffer bar.

2. A vehicle bumper, comprising, in combination, a buffer bar; slotted plugs in the ends of said buffer bar; spring arms adapted to be secured to the vehicle chassis and having straight end portions inserted into and adjustable within said slotted plugs; and set screws passing through the rear wall of said buffer bar and said plugs engaging said spring arms.

3. A vehicle bumper, comprising, in combination, a tubular buffer bar having flanged plugs inserted in opposite ends, said plugs having slots extending within the bar; flat spring arms adapted to be secured to the vehicle chassis and having end portions inserted in said slots; and means for securing said plugs and spring arm within the bar.

4. A vehicle bumper, comprising, in combination, a tubular buffer bar; a cast metal plug within each end of the tubular bar; said plug having a flanged end portion of substantially the same external diameter as the tubular bar and presenting a longitudinal slot therein; flat spring arms adapted to be secured to the vehicle chassis and having end portions inserted within said slots; and set screws for securing said flat spring arms in adjusted positions within said slots.

5. A vehicle bumper, comprising, in combination, a tubular buffer bar; slotted plugs within the ends of the buffer bar; flat spring arms secured within the slotted plugs; and fillet members between the ends of the buffer bar and the front side of said flat spring arms.

6. A vehicle bumper, comprising in combination, a tubular buffer bar; slotted plugs secured within the buffer bar; flat spring arms having their ends secured within said slots; said plugs presenting integral fillet members extending beyond the ends of said buffer bar and having curved surfaces merging into the faces of said spring arms.

7. A vehicle bumper, comprising, in combination, a tubular buffer bar; plugs inserted in the ends of said buffer bar and having spring arm receiving slots therein; spring arms inserted in said slots; said plugs having flanges engaging the ends of said buffer bar and of substantially the same external diameter as that of the buffer bar, ferrules on the ends of said buffer bar; and set screws for securing said ferrules, plugs and spring arms to the buffer bar.

In testimony, that I claim the foregoing as my own, I have hereto affixed my signature.

KENNETH LESTER HARRIS.